(No Model.)

C. I. HALL.
VALVE FOR HYDRAULIC ELEVATORS.

No. 466,231. Patented Dec. 29, 1891.

Witnesses:
D. D. Bent Jr.
B. N. Hall

Inventor:
Copeland I. Hall
By his Atty
John Richards

UNITED STATES PATENT OFFICE.

COFRAN I. HALL, OF SAN FRANCISCO, CALIFORNIA.

VALVE FOR HYDRAULIC ELEVATORS.

SPECIFICATION forming part of Letters Patent No. 466,231, dated December 29, 1891.

Application filed May 2, 1891. Serial No. 391,382. (No model.)

*To all whom it may concern:*

Be it known that I, COFRAN I. HALL, a citizen of the United States, residing at the city and county of San Francisco, State of California, have invented certain new and useful Improvements in Valves for Hydraulic Elevators; and I hereby declare the following specification and drawings to constitute a full and complete description of the same.

My invention relates to that class of elevators actuated by water under pressure and provided with valves to govern the inlet and escape of the water, controlling thereby the movements of the cage and its connected mechanism.

It consists in the construction, arrangement, and combination of parts, substantially as will be hereinafter described and claimed.

The object of my present invention is to provide, in addition to the ordinary stop-valves of hydraulic elevators, an automatic stop-valve operating independent of the main valves to cut off the flow of water in one direction at the extreme upper stroke by the movement of the cage, ram, or piston and independent of the attendant or hand controlling gear in the cage, leaving the main valves with their actuating mechanism to be reversed by hand when the cage is to be moved in an opposite direction, in this manner securing a more positive and safe action of the elevator and determining its full range and stopping-points irrespective of the load or resistance and effectually stopping the flow of water to or from the elevator piston or ram, at the same time permitting a free flow in the opposite direction. In this method of operating no movement or change of the main valves or their gearing is necessary in order to attain an exact stopping position at both the top and bottom landings.

The method of operating will be understood by the accompanying drawings, in which—

Figure 1:
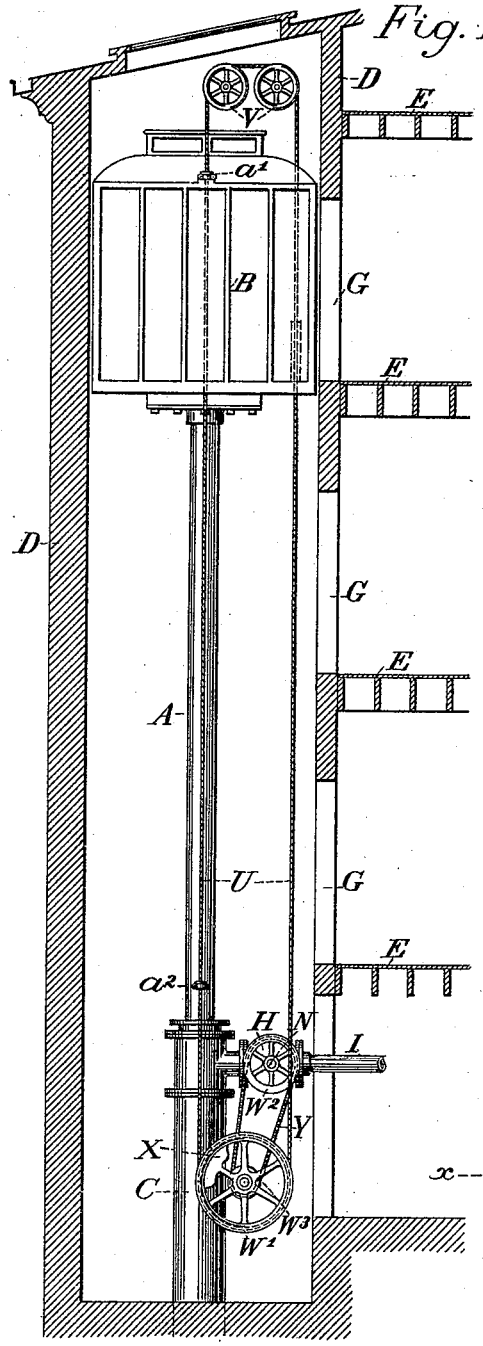
Figure 2:
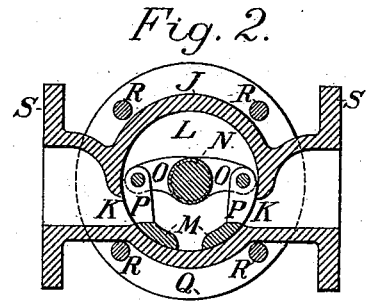
Figure 3:
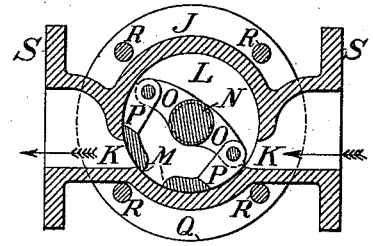
Figure 4:
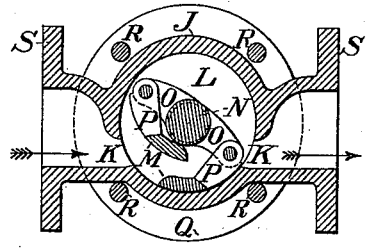
Figure 5:
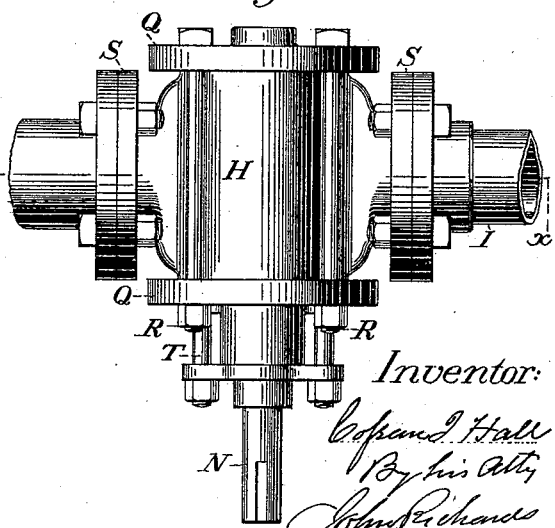

Figure 1 is an elevation, in section, of what is called a "direct" or "ram" elevator with one of my improved valves attached. Fig. 2 is a longitudinal section through one of my improved valves, showing it in a neutral position, permitting a flow of the water through it either way. Fig. 3 is another longitudinal section of the valve, showing it closed in the direction indicated by the arrows. Fig. 4 is also a longitudinal section of the valve, showing its position when the flow of water is reversed and the valve opens automatically independent of its actuating-gearing. Fig. 5 is a view on the top of the complete valve, showing the method of its construction externally.

A is the ram or piston, on which is supported the cage B. The main cylinder C, in which the ram B descends, is inserted in the earth in the usual way. The walls of the elevator-well D, floors E, and doors G are of the usual construction. The auxiliary valve H is the same as shown in the detail drawings from Figs. 2 to 5. The water-supply pipe I is shown broken off between the auxiliary valve H and the main valves, which are not included in the drawings. These latter may be of any kind that will control the inlet and escape of water through the pipe I.

Referring now to the construction of the valve H, the main shell J is cast with flanges S to connect at each end, has two oblong ports K, and is bored cylindrically in the central chamber L to receive the valves or plates M. Centrally in the chamber L is placed the oscillating stem N, on which are lugs O, to which are hung the plates M by means of corresponding lugs P, the two being joined by pins or rivets loose enough to permit a free swinging movement of the plates M. The ends of the chamber L are covered by the plates Q, clamped by the bolts R, one of the plates Q being provided with a packing-gland T to receive the stem N. The valve is operated by the rope or chain U, which passes up through the cage B and over the idle-pulleys V at the top and then down to the wheel W', around which the ends of the rope are passed for a sufficient distance and fastened thereto.

The valve H is operated by a second wheel $W^2$, placed on the stem N. This wheel is turned by a pitch-chain Y, connecting to a small pulley $W^3$ on the axis of the wheel W'. As the cage B rises and approaches the extreme upper stroke it engages a tappet $a'$ on the rope U, thus turning the wheels W', $W^2$, and $W^3$, moving the valve H into the position shown in Fig. 3, and arresting the flow of water through the pipe I. During this operation the main valves for the inlet and escape of water through the pipe I remain without action until the cage B is to descend. Then the pipe I is opened to the discharge or waste way, and the valve H assumes the position shown in Fig. 4, the water passing freely through it without any change in position of its actuating mechanism. As soon as the cage B begins to descend, releasing the tappet $a'$, the weight X, acting by gravity, turns the wheel W' sufficient to bring the valve H into the neutral position shown in Fig. 2. When the cage B descends to the bottom, it engages the other tappet $a^2$, and the various operations just described are reversed, the valve H shutting off the discharge flow and arresting the cage the same as at the top of the stroke. The weight X is turned to an opposite position on the wheel W', so that when the cage B again rises this weight will turn the wheel in the opposite direction automatically and bring the valve H to the neutral position shown in Fig. 2, as before.

Instead of the weight X there can be employed springs, hydraulic apparatus, or other means of returning the valve to its central or neutral position. I have shown in the present case a weight, that being the most simple means.

If, as is sometimes done, a simple stop-valve is employed as an auxiliary one to the main valves, then the main valves or the movement of the elevator cannot be reversed without first opening the auxiliary valve.

In my other pending application for Letters Patent upon an improvement in valves, filed of even dated herewith, Serial No. 391,381, I have made generic claims applicable substantially to a valve construction shown herein, as well as that shown in said case, and therefore claims to said valve construction do not appear herein.

I do not claim, broadly, the employment of auxiliary valves; but

What I do claim as new, and desire to secure by Letters Patent, is—

In an elevator-valve mechanism, the hereindescribed auxiliary valve, consisting, essentially, of the cylindrical valve-casing having oppositely-located ports K K, the centrally-located oscillating valve-stem N, the swinging and sliding valve-plate M, connected to the stem on opposite sides thereof, said plates being adapted to cover and uncover the ports K K, substantially in the manner specified, and the external means for oscillating the valve, consisting, essentially, of a wheel on the valve-stem, upper and lower pulleys in the elevator-shaft, a cord passing around these pulleys and through the cage, and a connecting-rope between the valve-stem wheel and the lower rope-pulley, substantially as described.

In testimony whereof I have hereunto affixed my signature in the presence of two witnesses.

COFRAN I. HALL.

Witnesses:
ALFRED A. ENQUIST,
BERT N. HILL.